United States Patent
Okaniwa et al.

(10) Patent No.: US 6,355,602 B1
(45) Date of Patent: Mar. 12, 2002

(54) GREASE COMPOSITION FOR CONSTANT VELOCITY JOINT

(75) Inventors: Takashi Okaniwa; Junichi Imai, both of Fujisawa; Yukio Hasegawa; Shinichi Takabe, both of Iwata, all of (JP)

(73) Assignees: Kyodo Yushi Co., Ltd., Tokyo; NTN Corporation, Osaka, both of (JP)

(*) Notice: Subject to any disclaimer, the term of this patent is extended or adjusted under 35 U.S.C. 154(b) by 0 days.

(21) Appl. No.: 09/606,190

(22) Filed: Jun. 29, 2000

(30) Foreign Application Priority Data

Jun. 29, 1999 (JP) .......................................... 11-184147

(51) Int. Cl.$^7$ ................... C10M 115/08; C10M 169/06
(52) U.S. Cl. .................. 508/168; 508/169; 508/364; 508/365; 508/379; 508/390; 508/552; 508/567
(58) Field of Search .................................. 508/551, 168

(56) References Cited

U.S. PATENT DOCUMENTS

| | | | |
|---|---|---|---|
| 3,095,375 A | 6/1963 | Pitman | 508/147 |
| 3,223,624 A | 12/1965 | Morway et al. | 508/164 |
| 3,730,895 A | 5/1973 | Kjonaas | 508/176 |
| 3,840,463 A | 10/1974 | Froeschmann et al. | 508/161 |
| 4,062,785 A | * 12/1977 | Nibert | 508/551 |
| 4,536,308 A | 8/1985 | Pehler et al. | 508/335 |
| 4,743,389 A | * 5/1988 | Braid et al. | 508/551 |
| 4,759,859 A | 7/1988 | Waynick | 508/159 |
| 4,787,992 A | 11/1988 | Waynick | 508/163 |
| 4,830,767 A | 5/1989 | Waynick | 508/163 |
| 4,840,740 A | 6/1989 | Sato et al. | 508/364 |
| 4,902,435 A | 2/1990 | Waynick | 508/163 |
| 5,126,062 A | 6/1992 | Barnes | 508/163 |
| 5,160,645 A | 11/1992 | Okaniwa et al. | 508/356 |
| 5,207,936 A | 5/1993 | Anzai et al. | 508/168 |
| 5,589,444 A | 12/1996 | Hatakeyama | 508/168 |
| 5,604,187 A | 2/1997 | Takeuchi et al. | 508/168 |
| 5,607,906 A | 3/1997 | Okaniwa et al. | 508/363 |
| 5,952,273 A | 9/1999 | Suzuki et al. | 508/168 |
| 6,037,314 A | 3/2000 | Kondo et al. | 508/168 |

FOREIGN PATENT DOCUMENTS

| | | |
|---|---|---|
| EP | 0 508 115 | 10/1992 |
| EP | 0 773 280 | 5/1997 |
| FR | 2 761 372 | 10/1998 |
| JP | 62-207397 | 9/1987 |
| JP | 4-041714 | 7/1992 |
| WO | WO 94/11470 | 5/1994 |
| WO | WO 96/02615 | 2/1996 |

* cited by examiner

Primary Examiner—Ellen M. McAvoy
(74) Attorney, Agent, or Firm—Oblon, Spivak, McClelland, Maier & Neustadt, P.C.

(57) ABSTRACT

A grease composition for constant velocity joints comprises the following components: (a) a base oil; (b) a diurea type thickening agent represented by the following formula (1):

$$R^1NH\text{—}CO\text{—}NH\text{—}C_6H_4\text{—}p\text{—}CH_2\text{—}C_6H_4\text{—}p\text{—}NH\text{—}CO\text{—}NHR^2 \quad (1)$$

(in the formula (1), $R^1$ and $R^2$ may be the same or different from one another and each represents an aryl group or a cycloalkyl group having 6 or 7 carbon atoms); (c) a molybdenum sulfurized dialkyl dithiocarbamate; (d) a molybdenum sulfurized dialkyl dithiophosphate; (e) molybdenum disulfide; (f) a calcium salt of an alkylaromatic sulfonic acid; and (g) a phosphorus free-and sulfur-containing extreme-pressure additive. The grease composition for constant velocity joints according to the present invention has a high ability of reducing the induced thrust force and is excellent in the durability.

10 Claims, 1 Drawing Sheet

GREASE COMPOSITION FOR CONSTANT VELOCITY JOINT

BACKGROUND OF THE INVENTION

The present invention relates to a grease composition for constant velocity joints and in particular to a grease composition for fixed type constant velocity joints of motorcars and a grease composition for sliding type constant velocity joints of motorcars. More particularly, the present invention pertains to a grease composition for constant velocity joints, which can efficiently lubricate portions of the joint which are easily worn out and are liable to generate abnormal vibrations or the like; can effectively reduce any friction; can suppress any vibration; and can improve the useful life of the joint.

In the field of motorcars, FF cars have rapidly increased and functional 4WD cars have likewise increased from the viewpoint of the reduction in the weight of cars and the insurance of the accommodation space thereof and accordingly, there have widely been used constant velocity joints (CVJ). FIG. 1 shows an embodiment of a Rzeppa type joint used as a fixed type constant velocity joint, among these CVJ's. In this Rzeppa type joint, when the joint transmits a running torque while it has a working angle, more severer lubricating conditions have been required for the fitting position of track grooves 2 of an outside wheel 1, track grooves 4 of an inside wheel 3 and balls 5, as the generating power of cars have been increased, cars have been driven at a higher speed and CVJ's have been lighter and smaller. For this reason, the conventionally used grease compositions such as a lithium-containing extreme-pressure grease, which contains a sulfur-phosphorus-containing extreme-pressure additive and a lithium-containing extreme-pressure grease, which comprises molybdenum disulfide are insufficient in the durability. Moreover, it has been required to improve the heat resistance of these grease compositions.

FIG. 2 shows an embodiment of a double offset joint (DOJ) used as a sliding type joint. In this DOJ, when the joint transmits a running torque, while it has a working angle, the joint undergoes complicated rolling and sliding motions at the fitting position of track grooves 3 of an outside wheel 1, track grooves 4 of an inside wheel 2 and balls 5, and the frictional resistance in the sliding portions of the joint generates a force in the axial direction. This force is referred to as "an induced thrust force". This DOJ is provided with the track grooves 3 on the internal face of the outside wheel 1 at intervals of 60 degrees and accordingly, the induced thrust force is generated 6 times per revolution.

If the cycle of such induced thrust forces is in agreement with the natural frequencies of, for instance, an engine, a car body and/or a suspension, a resonance of the car body is induced and this gives a disagreeable impression to the occupants of the car. Therefore, it is desirable to reduce the foregoing induced thrust force to a level of as low as possible. In a packaged motorcar, inconvenience such as beating and stuffy sounds is generated during high speed travelling of the car due to the. resonance.

The conventional lithium-containing extreme-pressure grease, which contains a sulfur-phosphorus-containing extreme-pressure additive, and a lithium-containing extreme-pressure grease, which comprises molybdenum disulfide, suffer from a problem concerning the vibration resistance. In addition, Japanese Un-Examined Patent Publication No. Sho 62-207397 discloses an extreme-pressure grease, which comprises, as an essential component, a sulfur-phosphorus-containing extreme-pressure additive comprising a combination of a molybdenum sulfurized dialkyl dithiocarbamate and at least one member selected from the group consisting of sulfurized fats and oils, sulfurized olefins, tricresyl phosphate, trialkyl phosphates and zinc dialkyl dithiophosphates. However, the extreme-pressure grease composition disclosed in this patent is still insufficient in the quietness.

SUMMARY OF THE INVENTION

Accordingly, it is an object of the present invention to provide a grease composition for constant velocity joints, which can efficiently lubricate such a constant velocity joint when it is applied to sides thereof to be lubricated, can efficiently inhibit any wear and is excellent in heat resistance and durability.

It is a further object of the present invention to provide a grease composition for constant velocity joints, which shows a high ability of reducing any induced thrust force and is excellent in the durability.

The inventors of this invention have conducted various intensive studies to solve the foregoing problems associated with the conventional grease compositions, have found that the foregoing objects of the present invention can effectively be achieved by the use of a specific combination of compounds and thus have completed the present invention.

According to the present invention, there is provided a grease composition for constant velocity joints, which comprises the following components:

(a) a base oil;

(b) a diurea type thickening agent represented by the following formula (1):

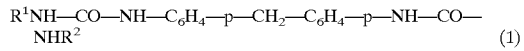

(in the formula (1), $R^1$ and $R^2$ may be the same or different from one another and each represents an aryl group or a cycloalkyl group having 6 or 7 carbon atoms);

(c) a molybdenum sulfurized dialkyl dithiocarbamate;

(d) a molybdenum sulfurized dialkyl dithiophosphate;

(e) molybdenum disulfide;

(f) a calcium salt of an alkylaromatic sulfonic acid; and (g) a phosphorus free-and sulfur-containing extreme-pressure additive.

DESCRIPTION OF THE PREFERRED EMBODIMENTS

Figure 1:
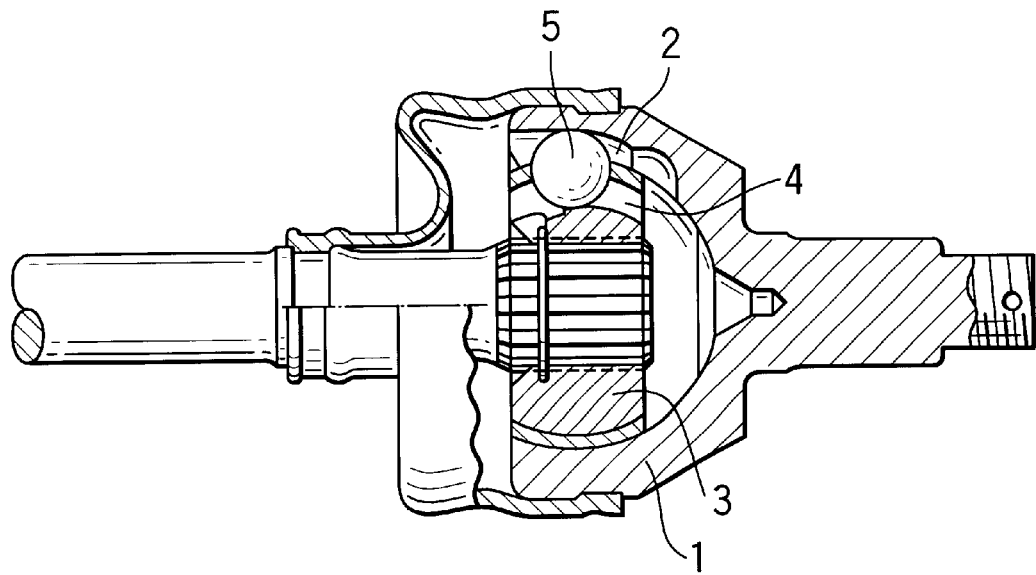
FIG. 1 is a partially broken side view of an embodiment of a Rzeppa type joint to which the grease composition according to the present invention can suitably be applied.
Figure 2:
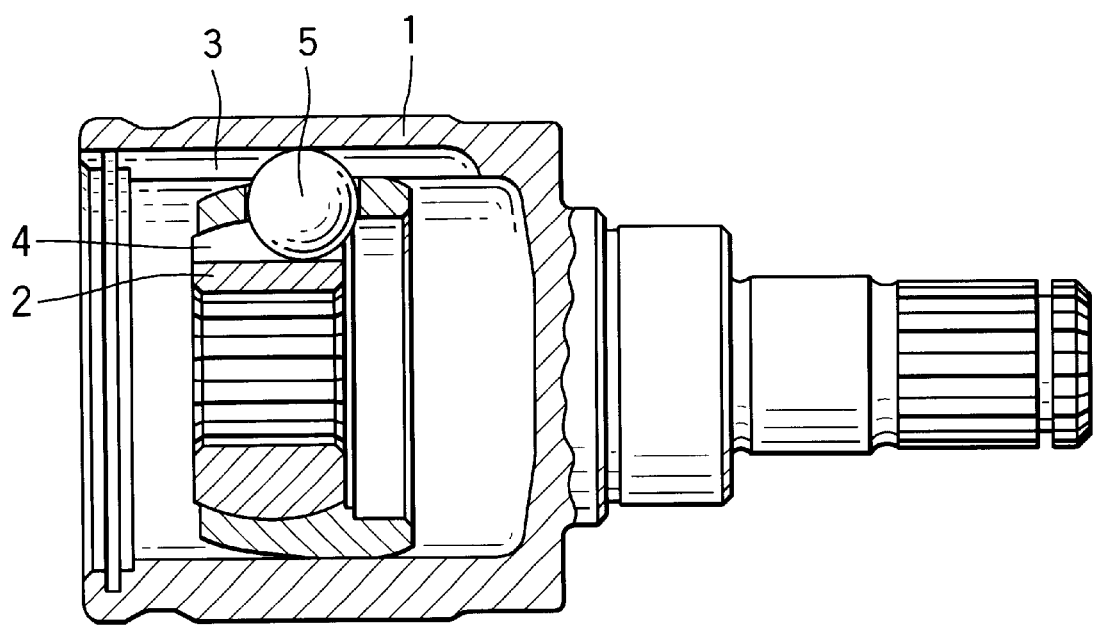
FIG. 2 is a partially broken side view of an embodiment of a double offset type joint to which the grease composition according to the present invention can suitably be applied.

As the base oil used in the present invention as the component (a), there may be listed, for instance, mineral oils, ester type synthetic oils, ether type synthetic oils and hydrocarbon type synthetic oils. These base oils may be used alone or in any combination of at least two of them.

The diurea type thickening agent used in the present invention as the component (b) may be those represented by the following Formula (2):

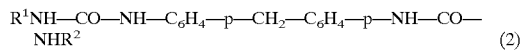

Wherein $R^1$ and $R^2$ may be the same or different from one another and each represents an aryl group or a cycloalkyl group having 6 or 7 carbon atoms.

Such a diurea type thickening agent may be prepared by reacting a monoamine such as aniline, p-toluidine or cyclohexylamine with diphenylmethane-4,4'-diisocyanate.

As the molybdenum sulfurized dialkyl dithiocarbamate used in the present invention, i.e., the component (c), particularly preferred are those represented by the following Formula (3):

$$[R^3R^4N-CS-S]_2-Mo_2OmSn \qquad (3)$$

In Formula (3), $R^3$ and $R^4$ each represents an alkyl group having 1 to 24 carbon atoms and m+n=4, provided that m ranges from 0 to 3 and n ranges from 4 to 1.

These compounds are known solid lubricating agents and disclosed in, for instance, Japanese Examined Patent Publication Nos. Sho 45-24562 (compounds of Formula (3) wherein m ranges from 2.35 to 3 and n ranges from 1.65 to 1) and Sho 53-31646 (compounds of Formula (3) in which m ranges from 0.5 to 2.3 and n ranges from 3.5 to 1.7).

As the molybdenum sulfurized dialkyl dithiophosphate used in the present invention, i.e., the component (d), particularly preferred are those represented by the following Formula (4):

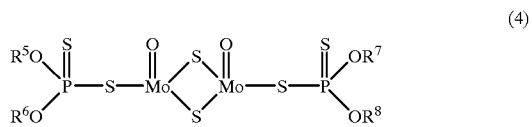

In Formula (4), $R^5$, $R^6$, $R^7$ and $R^8$ are the same or different from one another and each represents a primary or secondary alkyl group having 1 to 24 and preferably 3 to 20 carbon atoms; or an aryl group having 6 to 30 and preferably 8 to 18 carbon atoms.

The molybdenum disulfide used in the present invention as the component (e) is generally widely used as a solid lubricating agent. This compound has a layer lattice structure, is easily sheared into a thin layer structure due to sliding motions and accordingly, the compound shows effects of inhibiting any metal-to-metal contact and effects of inhibiting any scorching.

If it is added in a large amount, however, it would adversely affect the vibration resistance. In addition, it may sometimes increase the extent of wear depending on the lubrication conditions encountered.

The calcium salt used in the present invention as the component (f) is a calcium salt of a synthetic sulfonic acid, for instance, an alkyl aromatic sulfonic acid such as a dinonylnaphthalenesulfonic acid or an alkylbenzenesulfonic acid, which has been known as a metallic detergent-dispersant or a corrosion inhibitor used in a lubricating oil such as an engine oil.

Preferred examples of the phosphorus free-and sulfur-containing extreme-pressure additive used in the present invention as the component (g) are those having a sulfur content ranging from 35 to 50% by weight, preferably 40–45% by weight.

Preferably, the grease composition according to the present invention comprises, on the basis of the total weight of the composition, 1 to 25% by weight of the diurea type thickening agent (b); 0.1 to 5% by weight of the molybdenum sulfurized dialkyl dithiocarbamate (c); 0.1 to 5% by weight of the molybdenum sulfurized dialkyl dithiophosphate (d); 0.1 to 5% by weight of molybdenum disulfide (e); 0.1 to 5% by weight of the calcium salt of an alkyl aromatic sulfonic acid (f); and 0.1 to 5% by weight of the phosphorus free-and sulfur-containing extreme-pressure additive (g).

This is because if the content of the component (b) is less than 1% by weight, that of the component (c) is less than 0.1% by weight, that of the component (d) is less than 0.1% by weight, that of the component (e) is less than 0.1% by weight, that of the component (f) is less than 0.1% by weight and that of the component (g) is less than 0.1% by weight, the intended effect of the resulting grease composition is sometimes insufficient. On the other hand, if the content of the component (b) is more than 25% by weight, that of the component (c) is more than 5% by weight, that of the component (d) is more than 5% by weight, that of the component (e) is more than 5% by weight, that of the component (f) is more than 5% by weight and that of the component (g) is more than 5% by weight, the resulting grease composition never shows any further improvement in the effects.

The present invention will hereinafter be described in more detail with reference to the following Examples and Comparative Examples, but the scope of the present invention is not restricted by these specific Examples at all.

EXAMPLES 1 TO 3 AND COMPARATIVE EXAMPLES 1 TO 5

Preparation of Base Grease used in Examples 1 to 3 and Comparative Examples 1 to 5

To a container, there were added 4100 g of a base oil and 1012 g of diphenylmethane-4,4'-diisocyanate and the resulting mixture was heated to a temperature ranging from 70 to 80° C. To a separate container, there were added 4100 g of a base oil, 563 g of cyclohexylamine and 225 g of aniline, followed by heating the resulting mixture to a temperature ranging from 70 to 80° C. and addition of the mixture to the foregoing container. The temperature of the mixture was raised up to 160° C. while it was sufficiently stirred and then it was allowed to stand to give a base urea grease A. To the base grease A, there were added the additives specified in the following Table 1 in the amounts likewise specified in Table 1, a base oil was if necessary added thereto and the resulting mixture was treated with a three stage roll mill to thus adjust the consistency of the mixture to the grade of No. 1.

In all of the foregoing Examples and Comparative Examples, the base oil used for the grease compositions was a mineral oil having the following characteristic properties:

Viscosities: 141 mm²/s and 13.5 mm²/s as determined at 40° C. and 100° C., respectively;

Viscosity Index: 89

Moreover, a commercially available molybdenum disulfide grease was used as a sample of Comparative Example 5. The results thus obtained are summarized in the following Table 1 together with the consistencies (60 W) (as determined according to the method specified in JIS K 2220) and the dropping points (° C.) thereof (as determined according to the method specified in JIS K 2220).

1. Induced Thrust Force-Measuring Test: A true joint (a double offset type joint) was rotated while imparting a working angle to the joint and applying a torque thereto to thus determine a force generated in the axial direction, which was defined to be the induced thrust force. The induced thrust force is expressed in terms of the rate of reduction (%) relative to the induced thrust force observed for the commercially available molybdenum disulfide grease (Comparative Example 5).

2.
Test Conditions:

| | |
|---|---|
| Number of Revolution: | 900 rpm |
| Torque: | 15 kgf · m |
| Angle: | 5 deg. |

Measuring Time: 5 minutes after the initiation of the revolution.
2. Durability Test: A true joint (a Rzeppa type joint) was rotated and the durability was evaluated under the following conditions:
Test Conditions:

| | |
|---|---|
| Number of Revolution: | 200 rpm |
| Torque: | 100 kgf · m |
| Angle: | 5 deg. |

Criteria:
⊚: excellent; ○: good; Δ: slightly insufficient; X: insufficient.

TABLE 1

| Example No. | 1 | 2 | 3 |
|---|---|---|---|
| Base Grease | | | |
| Grease A | 92.0 | 93.5 | 90.0 |
| Additives | | | |
| 1) Component (c) | 2.0 | 2.0 | 2.0 |
| 2) Component (d) | 1.0 | 0.5 | 2.0 |
| 3) Component (e) | 2.0 | 2.0 | 2.0 |
| 4) Component (f) | 2.0 | 1.0 | 3.0 |
| 5) Component (g) | 1.0 | 1.0 | 1.0 |
| Total | 100 | 100 | 100 |
| Consistency (60 W) | 326 | 327 | 324 |
| Dropping Point (° C.) | 260< | 260< | 260< |
| Induced Thrust Force | −68 | −70 | −72 |
| Durability | ⊚ | ⊚ | ⊚ |

| Comparative Example No. | 1 | 2 | 3 | 4 | 5 |
|---|---|---|---|---|---|
| Base Grease | | | | | |
| Grease A | 94.0 | 94.0 | 94.0 | 93.0 | — |
| Additives | | | | | |
| 1) Component (c) | — | 2.0 | 2.0. | 2.0 | — |
| 2) Component (d) | 1.0 | 1.0 | 1.0 | 1.0 | — |
| 3) Component (e) | 2.0 | — | 2.0 | 2.0 | — |
| 4) Component (f) | 2.0 | 2.0 | — | 2.0 | — |
| 5) Component (g) | 1.0 | 1.0 | 1.0 | — | — |
| Total | 100 | 100 | 100 | 100 | — |
| Consistency (60 W) | 327 | 327 | 323 | 328 | 285 |
| Dropping Point (° C.) | 260< | 260< | 260< | 260< | 190 |
| Induced Thrust Force | −56 | −68 | −49 | −58 | ±0 |
| Durability | X | Δ | X | X | X |

1) Molybdenum sulfurized dialkyl dithiocarbamate (trade name: Molyyan A available from R.T. Vanderbilt Company);
2) Molybdenum sulfurized dialkyl dithiophosphate (trade name: Molyvan L, available from R.T. Vanderbilt Company);
3) Molybdenum disulfide (Molysulfide, available from CLIMAX MOLYBDENUM Company, average particle size: 0.45 μm);
4) Calcium sulfonate (NASUL 729, available from KING INDUSTRIES Company);
5) Sulfur-containing extreme-pressure additive (Anglamol 33, available from Nippon LUBRIZOL Company).

The grease compositions prepared in Examples 1 to 3, which comprised Components (c) to (g), showed high rates of reducing the induced thrust force and are also excellent in the durability. Contrary to this, there were observed low rates of reducing the induced thrust force and insufficient durabilities for the grease compositions of Comparative Example 1 free of any Component (c), Comparative Example 2 free of any Component (e), Comparative Example 3 free of any Component (f) and Comparative Example 4 free of any component (g).

As has been described above in detail, the grease composition for constant velocity joints according to the present invention has a high ability of reducing the induced thrust force and is excellent in the durability.

What is claimed is:

1. A grease composition for constant velocity joints consisting essentially of the following components:
  (a) a base oil;
  (b) a diurea type thickening agent represented by the following formula (1)

$$R^1NH-CO-NH-C_6H_4-p-CH_2-C_6H_4-p-NH-CO-NHR^2 \quad (1)$$

in the formula (1), $R^1$ and $R^2$ may be the same or different from one another and each represents an aryl group or a cycloalkyl group having 6 or 7 carbon atoms;
  (c) a molybdenum sulfurized dialkyl dithiocarbamate;
  (d) a molybdenum sulfurized dialkyl dithiophosphate;
  (e) molybdenum disulfide;
  (f) a calcium salt of an alkylaromatic sulfonic acid; and
  (g) a phosphorus free-and sulfur-containing extreme-pressure additive.

2. The grease composition for constant velocity joints as set forth in claim 1 wherein the constant velocity joint is a fixed type constant velocity joint.

3. The grease composition for constant velocity joints as set forth in claim 1 wherein the constant velocity joint is a sliding type constant velocity joint.

4. The grease composition for constant velocity joints as set forth in claim 1 wherein it comprises, on the basis of the total weight of the composition, 1 to 25% by weight of said diurea type thickening agent; 0.1 to 5% by weight of said molybdenum sulfurized dialkyl dithiocarbamate; 0.1 to 5% by weight of said molybdenum sulfurized dialkyl dithiophosphate; 0.1 to 5% by weight of said molybdenum disulfide; 0.1 to 5% by weight of said calcium salt of an alkyl aromatic sulfonic acid; and 0.1 to 5% by weight of said phosphorus free-and sulfur-containing extreme-pressure additive.

5. The grease composition for constant velocity joints as set forth in claim 4 wherein the constant velocity joint is a fixed type constant velocity joint.

6. The grease composition for constant velocity joints as set forth in claim 4 wherein the constant velocity joint is a sliding type constant velocity joint.

7. The grease composition for constant velocity joints as set forth in claim 4 wherein the component (c) is a member selected from the group consisting of compounds represented by the following formula (3):

$$[R^3R^4N-CS-S]_2-Mo_2OmSn \quad (3)$$

(in the formula (3), $R^3$ and $R^4$ each represents an alkyl group having 1 to 24 carbon atoms and m+n=4, provided that m ranges from 0 to 3 and n ranges from 4 to 1).

8. The grease composition for constant velocity joints as set forth in claim 4 wherein the component (d) is a member selected from the group consisting of compounds represented by the following formula (4):

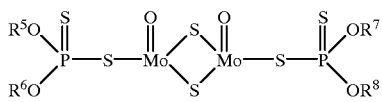 (4)

(in the formula (4), $R^5$, $R^6$, $R^7$ and $R^8$ are the same or different from one another and each represents a primary or secondary alkyl group having 1 to 24 carbon atoms; or an aryl group having 6 to 30 carbon atoms.

9. The grease composition for constant velocity joints as set forth in claim 8 wherein in the formula (4), $R^5$, $R^6$, $R^7$ and $R^8$ are the same or different from one another and each represents a primary or secondary alkyl group having 3 to 20 carbon atoms; or an aryl group having 8 to 18 carbon atoms.

10. The grease composition for constant velocity joints as set forth in claim 4 wherein the component (g) has a sulfur content ranging from 35 to 50% by weight.

\* \* \* \* \*